US012654655B2

(12) United States Patent
Audhav et al.

(10) Patent No.: US 12,654,655 B2
(45) Date of Patent: Jun. 16, 2026

(54) BRAKING SYSTEM FOR A VEHICLE

(71) Applicant: Volvo Truck Corporation, Gothenburg (SE)

(72) Inventors: Tove Audhav, Landvetter (SE); Arne Andersson, Mölnlycke (SE)

(73) Assignee: Volvo Truck Corporation, Gothenburg (SE)

( * ) Notice: Subject to any disclaimer, the term of this patent is extended or adjusted under 35 U.S.C. 154(b) by 746 days.

(21) Appl. No.: 18/076,563

(22) Filed: Dec. 7, 2022

(65) Prior Publication Data

US 2023/0182692 A1 Jun. 15, 2023

(30) Foreign Application Priority Data

Dec. 15, 2021 (EP) ..................................... 21214624

(51) Int. Cl.
*B60T 1/10* (2006.01)
(52) U.S. Cl.
CPC ..................................... *B60T 1/10* (2013.01)
(58) Field of Classification Search
CPC ............ B60T 1/10; B60T 17/02; F16D 65/78; H01M 16/00; H01M 2250/20; H01M 2250/40
See application file for complete search history.

(56) References Cited

U.S. PATENT DOCUMENTS

| | | | |
|---|---|---|---|
| 6,488,345 B1 | 12/2002 | Woody et al. | |
| 2021/0159520 A1 | 5/2021 | Lee et al. | |

2022/0371566 A1* 11/2022 Rahm ...................... F02B 33/34
2024/0270075 A1* 8/2024 Audhav ................... B60K 1/00
2024/0429412 A1* 12/2024 Audhav ................ B60L 58/30

FOREIGN PATENT DOCUMENTS

| | | |
|---|---|---|
| FR | 2865854 A1 | 8/2005 |
| JP | 2006034036 A | 2/2006 |

OTHER PUBLICATIONS

WO document No. WO 2022/253445 to Rahm et al published on Dec. 8, 2022.*
European Patent No. EP 4194248 to Kvist et al published on Jun. 14, 2023.*
European Patent No. EP 4242040 to Arya et al published on Sep. 13, 2023.*
Extended European Search Report for European Patent Application No. 21214624.5, mailed Jun. 13, 2022, 7 pages.
Examination Report for European Patent Application No. 21214624.5, mailed Jun. 2, 2025, 4 pages.

* cited by examiner

*Primary Examiner* — Pamela Rodriguez
(74) *Attorney, Agent, or Firm* — Withrow & Terranova, PLLC

(57) ABSTRACT

A braking system for a vehicle comprising a fuel cell system generating electric power to an electric power system arranged to propel an electric traction motor, the braking system comprising a tank arrangement comprising a first inlet configured to be arranged in downstream fluid communication with an outlet of the fuel cell system for receiving fuel cell exhaust, and a first outlet configured to at least convey fuel cell exhaust from the tank arrangement, and an air blower operable at least during power generative braking of the electric traction motor, the air blower being configured to convey ambient air into an air conduit, wherein the air conduit is extending between the air blower and a second inlet of the tank arrangement.

15 Claims, 6 Drawing Sheets

BRAKING SYSTEM FOR A VEHICLE

RELATED APPLICATIONS

The present application claims priority to European Patent Application No. 21214624.5, filed on Dec. 15, 2021, and entitled "BRAKING SYSTEM FOR A VEHICLE," which is incorporated herein by reference in its entirety.

TECHNICAL FIELD

The present invention relates to a braking system for a vehicle. Although the invention will mainly be directed to a vehicle in the form of a truck using an electric traction motor propelling the vehicle, the invention may also be applicable for other types of vehicles at least partially propelled by an electric traction motor, such as e.g. an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of e.g. a fuel cell electric vehicle (FCEV) as well as a battery electric vehicle (BEV) is a limiting factor. The reason is that for such type of vehicles, the auxiliary braking places a lot of energy in the cooling system.

There is thus a desire to provide a braking system for a vehicle which is at least partially propelled by an electric traction motor, which braking system puts less strain to the vehicle cooling system.

SUMMARY

It is thus an object of the present invention to at least partially overcome the above described deficiencies.

According to a first aspect, there is provided a braking system for a vehicle comprising a fuel cell system generating electric power to an electric power system arranged to propel an electric traction motor, the braking system comprising a tank arrangement comprising a first inlet configured to be arranged in downstream fluid communication with an outlet of the fuel cell system for receiving fuel cell exhaust, and a first outlet configured to at least convey fuel cell exhaust from the tank arrangement, and an air blower operable at least during power generative braking of the electric traction motor, the air blower being configured to convey ambient air into an air conduit, wherein the air conduit is extending between the air blower and a second inlet of the tank arrangement.

The wording "during power generative braking" should be construed such that the electric traction motor generates electric power, i.e. operates as a generator when controlling the vehicle speed. The electric traction motor may thus preferably be operable as an electric motor as well as an electric generator. The generated electric power may, for example, be transmitted to an energy storage system of the vehicle during so-called regenerative braking in which the energy storage system is charged with electric power. On the other hand, the generated power may also, or instead of, be transmitted to control the air blower to pressurize and convey a flow of air into the air conduit. In the latter case, the electric power generated by the electric traction motor is dissipated by controlling the air blower to supply the flow of air.

The air blower should be construed as a device which is able to receive air and to direct the air further through the air conduit. The air blower may, as an example, be an air fan. The air blower should preferably be configured to at supply an at least slightly pressurized and heated flow of air through the air conduit. The air blower may, for example, be an electrically controlled air blower configured to receive electric power from the electric power system, or as will be described in further detail below, be connected to and operable by an electric machine. According to a preferred example embodiment, the air blower may be an air compressor.

Furthermore, and according to an example embodiment, the tank arrangement may comprise a liquid fluid and a gaseous fluid. The liquid fluid may preferably be water, while the gaseous fluid preferably contains at least water exhausted from a cathode side of the fuel cell system.

The present invention is based on the insight that by supplying air from the air blower into the tank arrangement, the temperature level in the tank arrangement can be increased and more liquid fluid can thereby be transported out through the first outlet instead of remaining in the tank arrangement. In detail, the inventors have realized that an increased temperature will reduce the amount of fuel cell exhaust condensate in the tank arrangement. By transporting more liquid fluid out through the first outlet has the benefit of being able to use a smaller tank arrangement for the liquid portion of the fuel cell exhaust. Also, the air from the air blower will also be able to contribute to the transportation of liquid fuel cell exhaust. Furthermore, by mixing the fuel cell exhaust with the air from the air blower as described above, the cooling system may be exposed to less strain.

Furthermore, the fuel cell exhaust can, with the use of the tank arrangement, reduce the temperature of the flow of pressurized air supplied by the air blower. Hereby, the temperature of the flow exhausted from the first outlet can be relatively low and thereby being used for e.g. cooling auxiliaries of the vehicle. Such auxiliary may be the wheel brake of the vehicle, or a brake resistor, etc. Cooling the wheel brake thus has the additional advantage that these wheel brakes can be operated with an increased braking capability, i.e. improving the overall braking performance of the vehicle.

Furthermore, dissipating electric power during power generative braking has the additional advantage of providing a substantially continuous auxiliary braking operating of the vehicle, irrespective of a state-of-charge (SOC) level of a vehicle battery or energy storage system. Thus, the vehicle can be charged with electric power during power generative braking, and when the SOC level exceeds a predetermined threshold limit, the electric power generated during power generative braking can instead be dissipated by controlling the air blower. Obviously, the braking system may be controlled such that a portion of the electric power generated during the power generated braking is transmitted to vehicle battery, while a remaining portion is used for controlling the air blower to convey the flow of air into the air conduit while at the same time charging the vehicle battery.

Accordingly, an advantage of the present invention is that improved auxiliary braking performance can be achieved while at the same time reducing the strains on the cooling system.

According to an example embodiment, the braking system may further comprise an electric machine configured to be electrically connected to the electric power system, wherein the air blower is connected to, and operable by, the electric machine. Hereby, the electric machine is operable to dissipate electric power generated during the power generative braking operation of the electric traction motor.

According to an example embodiment, the second inlet may be arranged at a vertically lower position of the tank arrangement compared to the position of the first inlet. Hereby, the second inlet of the tank arrangement, i.e. the inlet from the air conduit, can be arranged at a portion of the tank arrangement containing liquid fluid. It should however be readily understood that the present invention is not limited to a single first inlet from the fuel cell system, the tank arrangement may as well be provided with a plurality of first inlets, i.e. a plurality of conduits supplies the flow of fuel cell exhaust to the tank arrangement. As an example, one of the plurality of first inlets may be configured to primarily direct gaseous fuel cell exhaust into the tank arrangement, while a another one of the plurality of first inlets may be configured to primarily direct liquid fuel cell exhaust into the tank arrangement. A humidifier or similar arrangement may be arranged downstream the fuel cell outlet, whereby the humidifier divides the fuel cell exhaust into a gaseous portion and a liquid portion.

According to an example embodiment, the air conduit may extend through the tank arrangement between the second inlet and a second outlet. Hereby, the air conduit is operable as a heat exchanger, and the pressurized air from the air conduit is not mixed with the fuel cell exhaust in the tank arrangement. When the pressurized air travels through the air conduit within the tank arrangement, the temperature of the pressurized air is reduced. In further detail, the temperature level of the pressurized air is lower at the downstream side of the tank arrangement compared to a position upstream the tank arrangement. The fuel cell exhaust condensate on the other hand is heated by the pressurized air directed through the tank arrangement. When the water and air in the tank arrangement is warmer, it becomes easier to exhaust the air from the water in the tank arrangement since warm air is able to hold water to a better extent than cold air. The water in the tank arrangement may, if the temperature of the pressurized air is sufficiently high, even boil off in the tank arrangement.

According to an example embodiment, the braking system may further comprise a bypass valve, the bypass valve being arranged in the air conduit at a position between the air blower and the tank arrangement, the bypass valve being configured to controllably prevent air conveyed from the air blower to reach the tank arrangement. An advantage is that, based on the temperature of the pressurized air as well as the temperature of the tank arrangement, the pressurized air can bypass the tank arrangement and thus not enter the tank arrangement. Preferably, and according to an example embodiment, the braking system may further comprise a bypass conduit, the bypass conduit extending from the bypass valve to a position of the air conduit downstream the tank arrangement.

According to an example embodiment, the braking system may further comprise at least one air flow restrictor, the at least one air flow restrictor being arranged in the air conduit at a position downstream the air blower. Preferably, and according to an example embodiment, the at least one air flow restrictor may be arranged in the air conduit at a position between the air blower and the tank arrangement. The air flow restrictor increased the flow velocity of the air from the air blower. The air flow restrictor also increases the temperature level of the air. An advantage is that an improved heating process of the fuel cell exhaust in the tank arrangement is provided. As another alternative, and according to an example embodiment, the air flow restrictor can be a valve controlling the flow of air in the air conduit. A valve, when being closed, will generate a reduction of pressure in the tank arrangement, and an increased pressure at the air blower side when also operating the air blower, which is advantageous when controlling a so-called pressure map of the air blower.

According to an example embodiment, the braking system may further comprise an air heating arrangement, the air heating arrangement being arranged in the air conduit at a position upstream the tank arrangement, or at a position downstream the tank arrangement, the air heating arrangement being electrically connectable to the electric power system.

Positioning the air heating arrangement upstream the tank arrangement further improves the heating process of the fuel cell exhaust in the tank arrangement. By positioning the air heating arrangement downstream the tank arrangement enables for a reduction of the air temperature supplied to the air heating arrangement when using the air heating arrangement for dissipating electric power. Preferably, and according to an example embodiment, the air heating arrangement may be an electric resistor arrangement.

According to an example embodiment, the tank arrangement may comprise a first tank and a second tank arranged in fluid communication with each other, wherein the first inlet and first outlet are arranged in the first tank, and the second inlet is arranged in the second tank. Hereby, the first and second tanks can be arranged at different positions of the vehicle, thereby simplifying the installation process. According to an example embodiment, the first and second tanks may be connected to each other by a tank conduit.

According to a second aspect, there is provided a vehicle, comprising an electric traction motor electrically connected to an electric power system, the electric traction motor being configured to receive electric power from the electric power system during propulsion and to supply electric power, generated during braking, to the electric power system, wherein the vehicle further comprises a fuel cell system configured to generate electric power, the fuel cell system being electrically connected to the electric power system, and a braking system according to any one of the embodiments described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
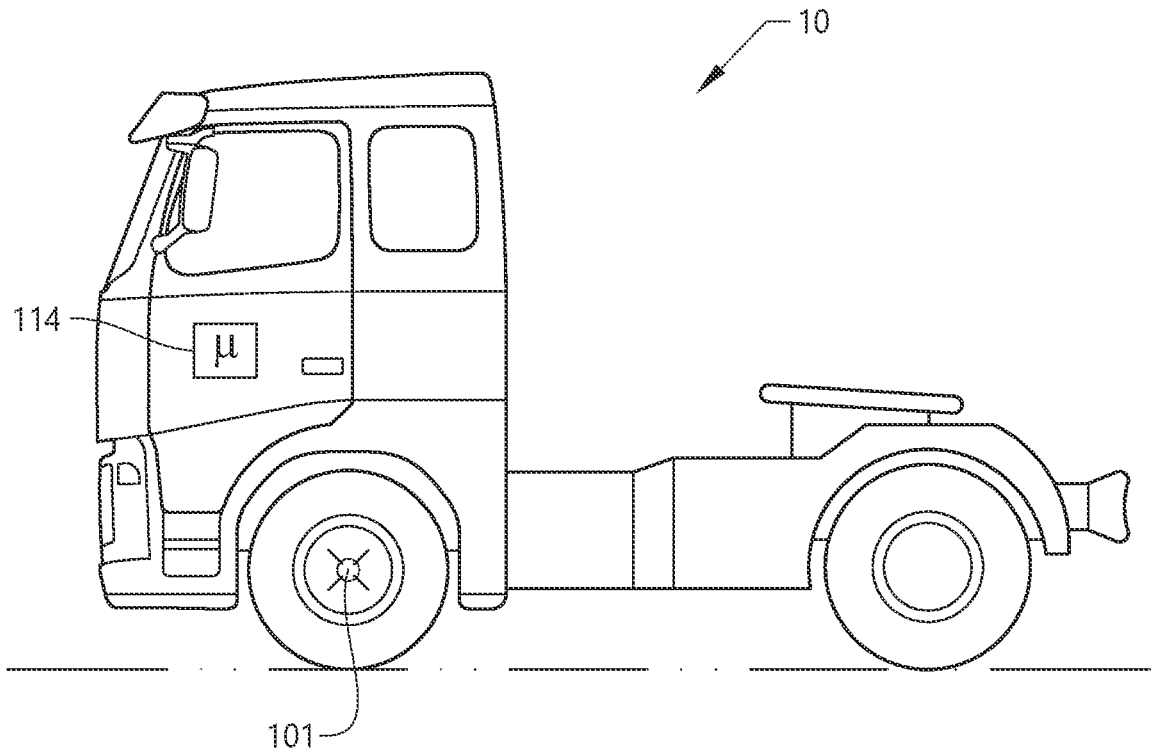
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. The traction motor 101 is in the example embodiment an electric traction motor 101 in the form of an electric machine, which is arranged to receive electric power from an electric power system (104 in FIG. 2) and/or directly from e.g. a fuel cell system (see FIG. 2). The vehicle 10 also comprises a control unit 114 for controlling various operations, and a braking system (not shown in detail in FIG. 1) operable to perform an auxiliary braking action for the vehicle 10.

The control unit 114 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

Figure 2:
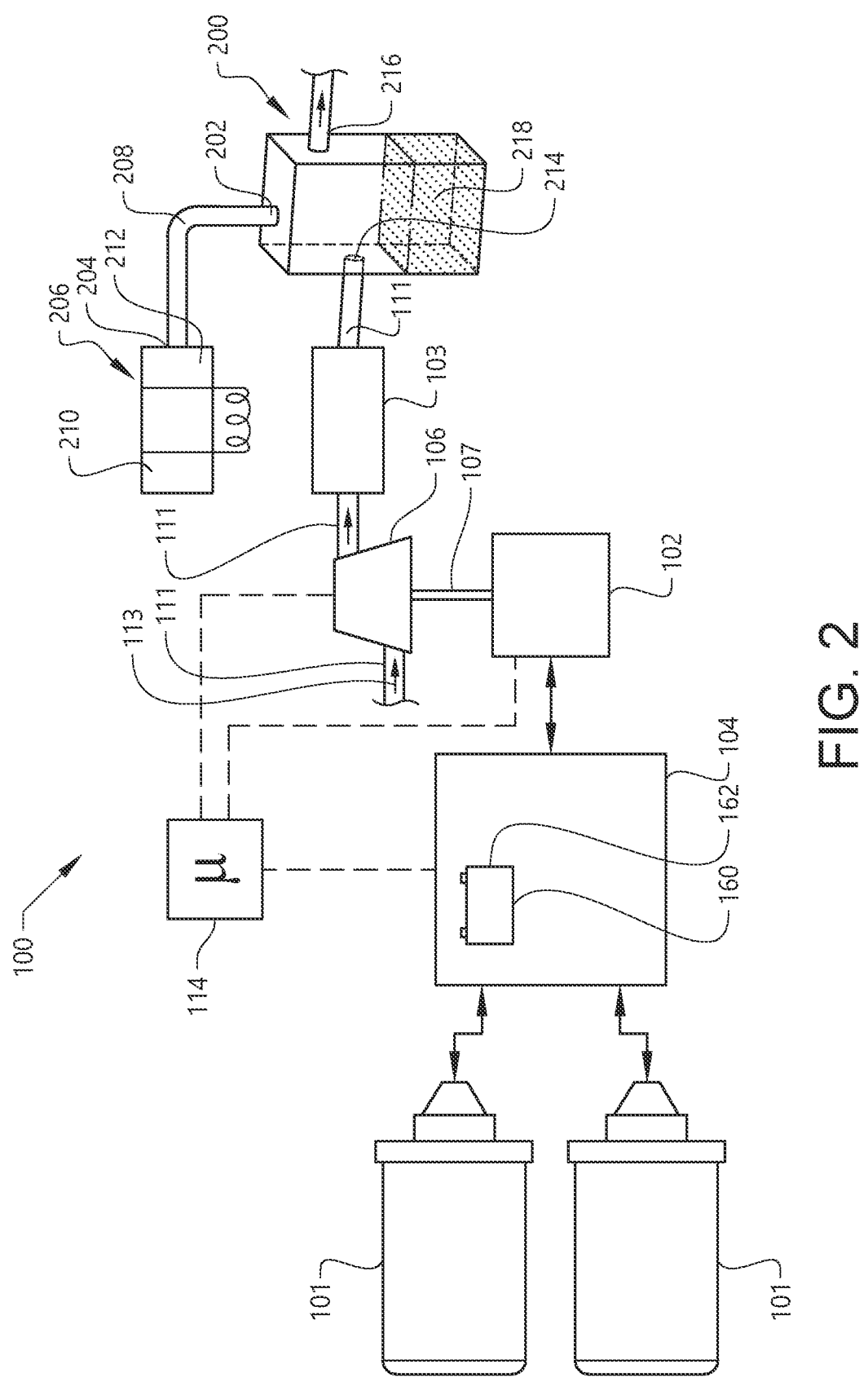
FIG. 2 is a schematic illustration of a braking system according to an example embodiment.

In order to describe the braking system 100 in further detail, reference is made to FIG. 2 which is a schematic illustration of a braking system according to an example embodiment. The braking system 100 comprises an electric traction motor 101, in FIG. 2 illustrated as a pair of electric traction motors 101. The braking system 100 further comprises an electric power system 104 which is connected to the electric traction motor(s) 101 for supply of electric power to the electric power to the electric traction motor(s) 101 when the electric traction motor(s) 101 is/are propelling vehicle 10, and to receive electric power from the electric traction motor(s) 101 when the electric traction motor(s) 101 operates in a regenerative braking mode. Thus, the braking system 100 can be referred to as an auxiliary braking system 100.

The electric power system 104 further comprises an electric storage system 160. The electric storage system 160 is preferably arranged in the form of a vehicle battery and will in the following be referred to as a battery 162. The battery 162 is configured to receive electric power generated by the electric traction motor(s) 101 when the electric traction motor(s) 101 operates in the regenerative braking mode. The battery 162 is also arranged to supply electric power to the electric traction motor(s) 101 when the electric traction motor(s) 101 propel the vehicle 10. Although not depicted in FIG. 2, the electric power system 104 may comprise various components, such as traction inverters, brake inverters, a junction box, etc.

The above described control unit 114 is connected to the electric power system 104. The control unit 114 comprises control circuitry for controlling operation of the electric power system. The control unit 114 thus receives data from the electric power system 104, such as e.g. a state-of-(SOC) of the battery 162, etc., and transmits control signals to the electric power system 104.

The braking system 100 also comprises an air blower 106. The air blower 106 is preferably an air compressor 106 and will in the following be referred to as such. The air compressor 106 is arranged in an air conduit 111 and configured to receive air 113. The received air 113 is pressurized by the air compressor 106 and supplied further through the air conduit 111 downstream the air compressor 106. The air compressor 106 can be an electrically controlled air compressor 106 operable by receiving electric power from the electric power system. However, and as exemplified in the embodiment of FIG. 2, the braking system 100 comprises an electric machine 102 connected to the electric power system 104. The electric machine 102 is thus operated by receiving electric power from the electric power system 104. The electric machine 102 is thus arranged as an electric power consumer. The air compressor 106 is connected to, and operable by, the electric machine 102. As illustrated in FIG. 2, the air compressor 106 is mechanically connected to the electric machine 102 by an output shaft 107 of the electric machine 102. In further detail, the air compressor 106 is operated by rotation of the output shaft 107, which rotation is generated by operating the electric machine 102.

Moreover, the braking system 100 further comprises a tank arrangement 200. The tank arrangement 200 comprises a first inlet 202 arranged in fluid communication with an outlet 204 of a fuel cell system 206. In detail, a fuel cell conduit 208 is connected between the outlet 204 of the fuel cell 206 and the first inlet 202. In particular, the fuel cell comprises an anode side 210 which is arranged to receive a hydrogen fuel from a fuel tank (not shown), and a cathode side 212 having a cathode inlet configured to receive e.g. oxygen, and the outlet 204 configured to exhaust fuel cell exhaust. The fuel cell exhaust comprises e.g. water and gas (such as e.g. oxygen and air). The fuel cell conduit 208 is thus configured to convey fuel cell exhaust from the cathode side 212 of the fuel cell system 206 to the tank arrangement 200.

Furthermore, the tank arrangement 200 also comprises a second inlet 214. The second inlet 214 is configured to receive a flow of pressurized air from the air compressor 106. Hence, the air conduit 111 is arranged between the air compressor 106 and the second inlet 214. Also, the tank arrangement 200 comprises a first outlet 216. Although not depicted in the figures, the tank arrangement 200 may also comprise a drainage outlet arranged at the bottom of the tank. Hereby, the tank arrangement 200 can be manually (or automatically) drained when there is a need to do so, such as e.g. when the liquid level in the tank arrangement exceeds a predetermined threshold level.

The tank arrangement 200 depicted in FIG. 2 is thus arranged to receive fuel cell exhaust from the fuel cell conduit 208 as well as pressurized air from the air conduit 111. During operation, the tank arrangement 200 hereby comprises water 218 at a lower portion of the tank arrangement 200. Each of the first 202 and second 214 inlets, as well as the first outlet 216, are preferably arranged above the water level in the tank arrangement 200, where the second inlet 216 is preferably arranged vertically below the first inlet 202 and the first outlet 216. However, the first inlet 202 and the first outlet 216 may both be arranged at the same vertical position, such as at the top of the tank arrangement 200, as is also exemplified in FIG. 3b and briefly described below. The first inlet 202 may also be arranged vertically below the first outlet 216. A mixture of water and pressurized air is hereby present in the tank arrangement 200 and a mixture of pressurized air and fuel cell exhaust is exhausted from the first outlet 216. The temperature level of the pressurized air from the air compressor 106 is hereby reduced when interacting with the fuel cell exhaust. At the same time, the fuel cell exhaust is heated, whereby the heated air can hold the water to a greater extent when being exhausted through the first outlet 216. The pressurized air from the air compressor 106 can also advantageously transport water away from the tank arrangement 200. The first outlet 216 can be further directed to a component of the vehicle in need of e.g. cooling, or to the ambient environment which will be described in further detail below. It should also be observed that the air compressor 106 can direct pressurized air to the tank arrangement 200 even at situations when no fuel cell exhaust is supplied into the tank arrangement from the fuel cell arrangement. In such situation, the tank arrangement 200 can be pre-heated.

Moreover, and as exemplified in FIG. 2, the braking system 100 further comprises a flow restriction arrangement 103 in the air conduit 111. The flow restriction arrangement 103 is arranged in downstream fluid communication with the air compressor 106 and configured to increase the pressure level of the flow of air exhausted by the air compressor 106. More particularly, the flow restriction arrangement 103 is arranged in fluid communication between the air compressor 106 and the second inlet 214 of the tank arrangement 200. Although not depicted in FIG. 2, the braking system may also comprise a check valve or other control mechanism in the fuel cell conduit 208 for preventing a back flow through the fuel cell conduit 208 from the tank arrangement to the fuel cell arrangement.

Still further, the control unit 114 is also connected to the electric machine 102 and the air compressor 106 for controlling operation thereof. Although not depicted, the control unit 114 may also be connected to the fuel cell system 206 for controlling operation of the fuel cell system 206.

Figure 3A:
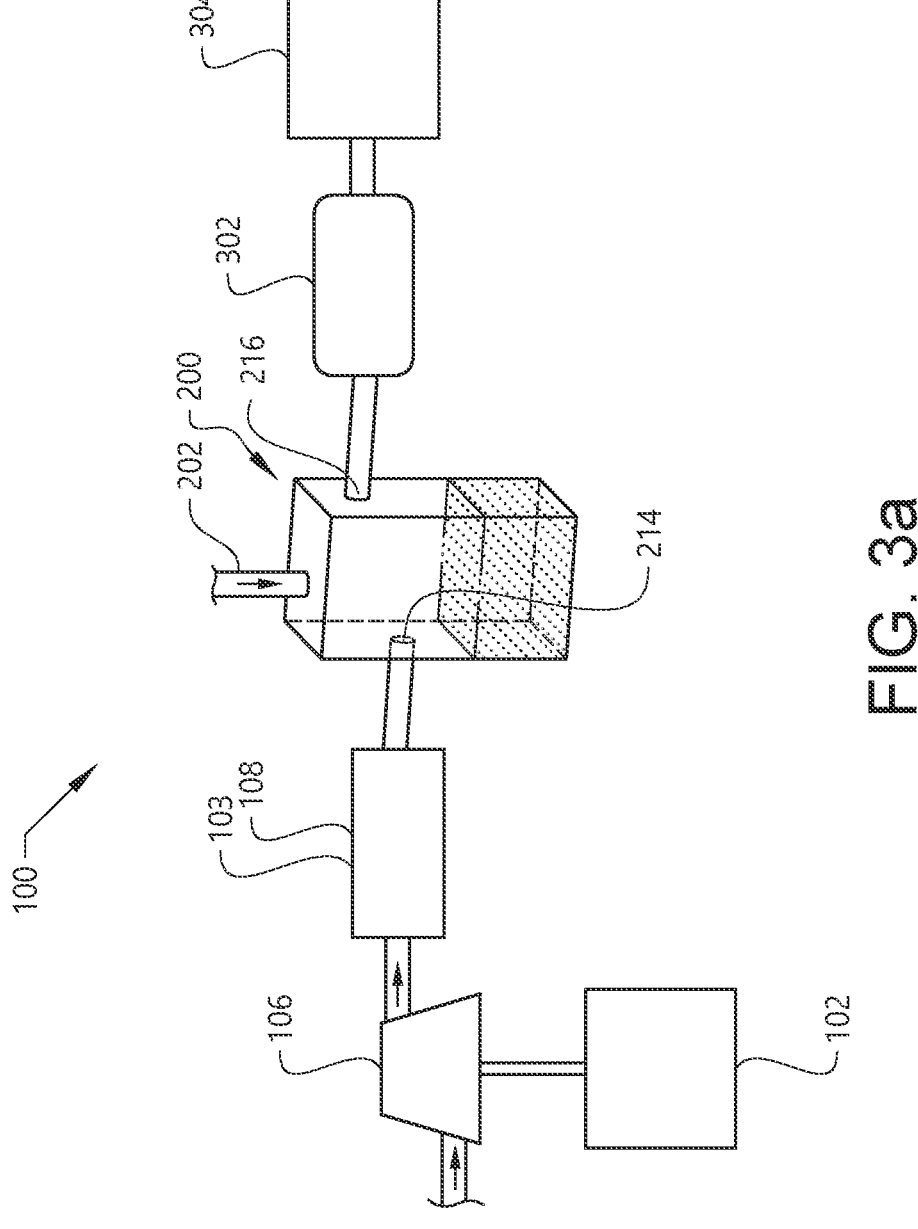
FIG. 3*a* is a schematic illustration of a braking system according to a further example embodiment.

In order to describe the braking system according to another example embodiment, reference is now made to FIG. 3a. The FIG. 3a example embodiment is similar to the embodiment described above in relation to FIG. 2. Thus, the following will only describe the additional features of the FIG. 3a embodiment and features also included in the FIG. 2 embodiment have been omitted from the below disclosure but should be construed, unless stated otherwise, as also included. The control unit 114 as well as the fuel cell system 206 are not depicted in FIG. 3a but should be construed as arranged in the same manner as described above.

In FIG. 3a, the braking system 100 may still comprise the above described flow restriction arrangement 103 between the air compressor 106 and the second inlet 214. However, as an alternative or as a complement, the braking system 100 may comprise an air heating arrangement 108 in the air conduit 111. The air heating arrangement 108 is preferably an electric resistor arrangement which is connected to the electric power system 104. Thus, the electric resistor arrangement receives electric power from the electric power system 104 and thereby increases the temperature level of the pressurized air supplied into the air tank arrangement 200 via the second inlet 214. Hereby, the temperature level of the fuel cell exhaust in the tank arrangement 200 can be even further increased. It should be readily understood that the braking system 100 may, as an alternative, be provided with an electric resistor arrangement downstream the first outlet 216 if the purpose of the braking system 100 is to supply a flow of heated air from the first outlet 216.

Moreover, the braking system 100 in FIG. 3a also comprises a muffler 302 arranged downstream the first outlet 216. The muffler 302 can advantageously reduce noise as well as to provide a pressure drop of the air exhausted through the first outlet 216. Also, a vehicle component 304, or vehicle auxiliary, in need of coolant is provided downstream the first outlet 216. Since the air exhausted through the first outlet has a reduced temperature level compared to the temperature level of the pressurized air directed into the tank arrangement 200 at the second inlet, the temperature level of the vehicle auxiliary 304 can be efficiently reduced. The vehicle auxiliary 304 can, according to a few non-limiting examples, be a disc brake, a resistor, an electric motor, etc.

Figure 3B:
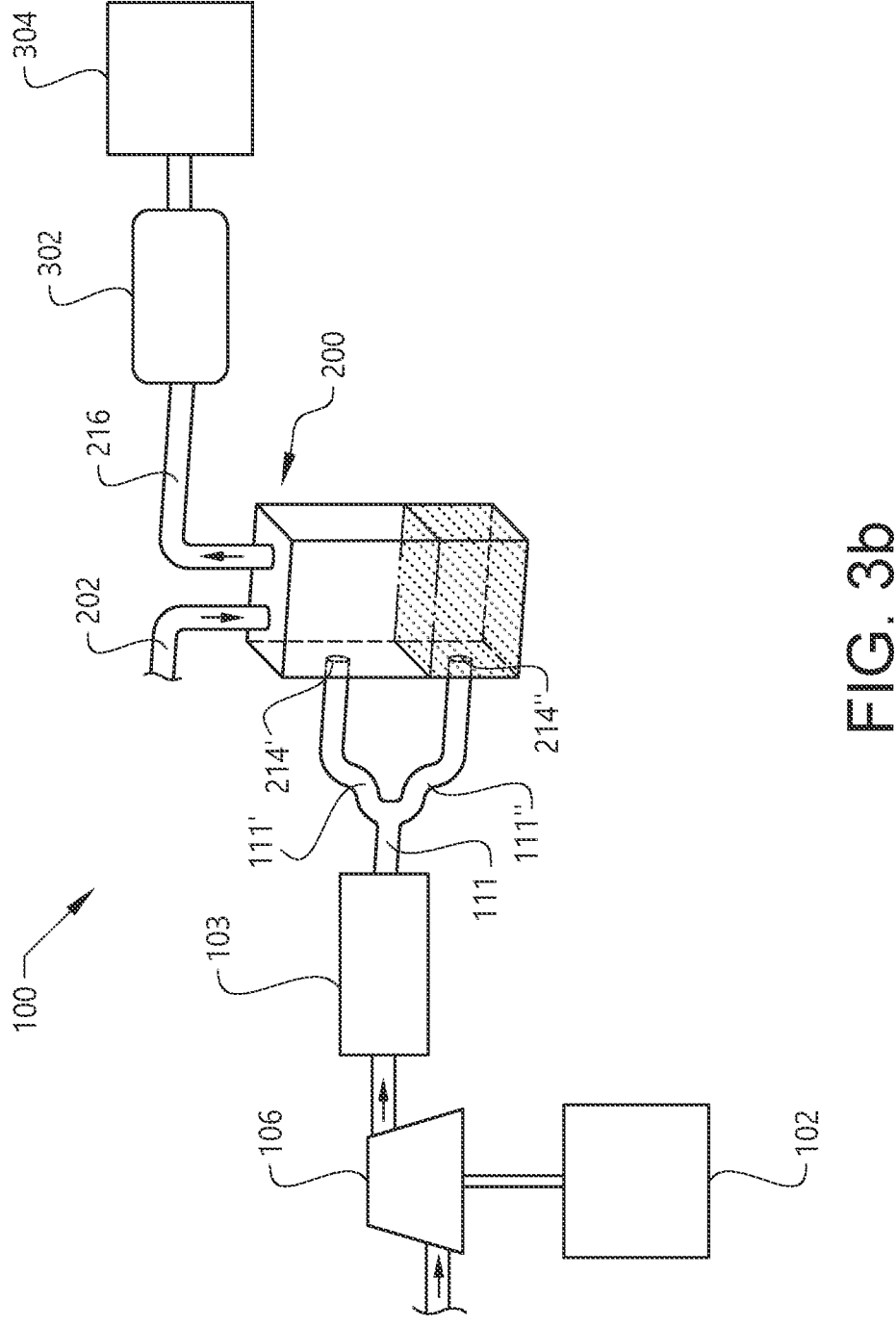
FIG. 3*b* is a schematic illustration of the tank arrangement according to an example embodiment.

In order to describe a further alternative example embodiment of the tank arrangement 200, reference is made to FIG. 3b. As can be seen in FIG. 3b, the air conduit 111 is split into a first air conduit portion 111' and a second air conduit portion 111". The first air conduit portion 111' is directed into the tank arrangement 200 at a first portion 214' of the second inlet 214, and the second air conduit portion 111" is directed into the tank arrangement 200 at a second portion 214" of the second inlet 214. The first portion 214' of the second inlet 214 is preferably arranged above the fluid level of the tank arrangement 200, while the second portion 214" of the second inlet 214 is preferably arranged below the fluid level of the tank arrangement 200. Hereby, the pressurized air entering the tank arrangement 200 at the second portion 214" will heat the liquid fluid and push the fluid upwards in the tank arrangement 200, i.e. generate a flow turbulence. The pressurized air entering the tank arrangement 200 at the first portion 214' will transport the air and liquid moisture through the first outlet 216. As can be seen in FIG. 3b, and as indicated above, the first outlet 216 is exemplified as being position on the top end of the tank arrangement. Although not depicted in FIG. 3b, the air conduit 111 may comprise a valve for controlling the flow to either or both of the first 111' and second 111" air conduit portions.

Figure 4:
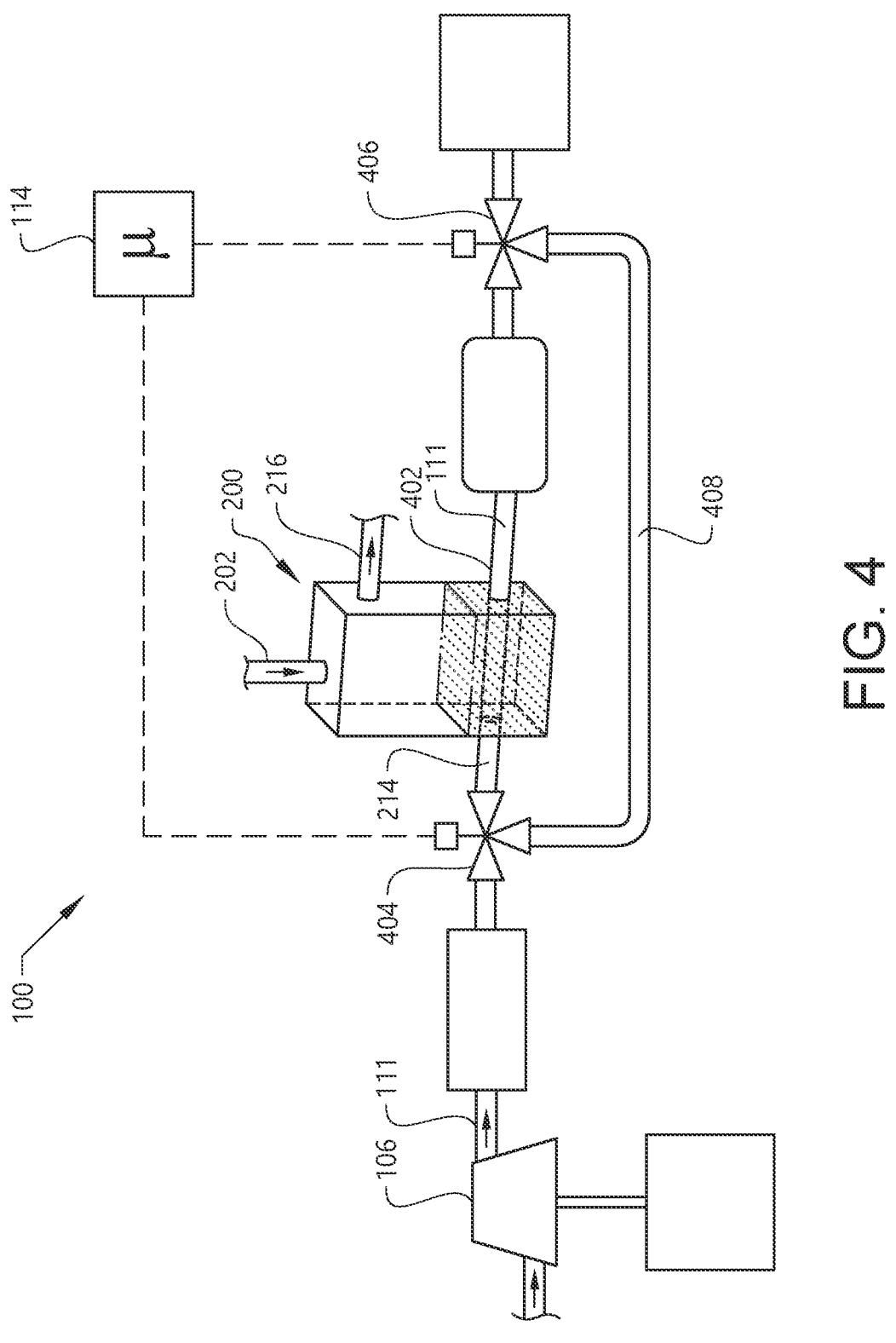
FIG. 4 is a schematic illustration of a braking system according to a still further example embodiment.

Reference is now made to FIG. 4 which is a schematic illustration of the braking system 100 according to a still further example embodiment. The following will only describe the difference between the embodiment depicted in FIG. 4 and the embodiments described above in relation to FIGS. 2, 3a and 3b. The FIG. 4 example embodiment may thus comprise similar features as the embodiments described above in relation to FIGS. 2, 3a and 3b unless explicitly stated otherwise. The fuel cell system 206 is not depicted in FIG. 4 but should be construed as arranged in the same manner as described above.

As can be seen in FIG. 4, the air conduit 111 extends through the air tank arrangement 200 between the second inlet 214 and a second outlet 402. The tank arrangement 200 thus comprises a first 202 and a second 214 inlet and a first 216 and a second 402 outlet. The first inlet 202 is still configured to receive a flow of fuel cell exhaust. However, the pressurized air from the air compressor 106 is not mixed with the fuel cell exhaust in the tank arrangement 200. On the contrary, air conduit 111, which is preferably positioned below the water level in the tank arrangement 200, is acting as a heat exchanger in the air tank arrangement 200. The water from the fuel cell exhaust is thus heated by the pressurized air directed through the air conduit 111 in the tank arrangement 200. At the same time, the temperature level of the pressurized air is reduced when directed through the air conduit 111 in the tank arrangement 200. A flow of cooled pressurized air is thus exhausted through the second outlet 402, while a flow of heated fuel cell exhaust is directed through the first outlet 216.

The braking system 100 exemplified in FIG. 4 also comprises a first bypass valve 404 arranged in the air conduit 111 at a position between the air compressor 106 and the second inlet 214 of the tank arrangement 200. The first bypass valve 404 is connected to, and controlled by, the control unit 114 to controllably prevent pressurized air from reaching the tank arrangement 200. More particular, the control unit 114 is configured to control the first bypass valve 404 to controllably bypass the tank arrangement 200 by directing the flow of pressurized air through a bypass conduit 408. The bypass conduit 408 is connected to the air conduit 111 at a position downstream the second outlet 402 of the tank arrangement 200. In FIG. 4, the bypass conduit 408 is connected to the air conduit 111 downstream the second outlet 402 by means of a second bypass valve 406 which is connected to, and controlled by, the control unit 114. It should however be readily understood that the bypass conduit may as an alternative be fixedly connected to the air conduit 111 downstream the second outlet 402 without the use of a second bypass valve 406.

Figure 5:
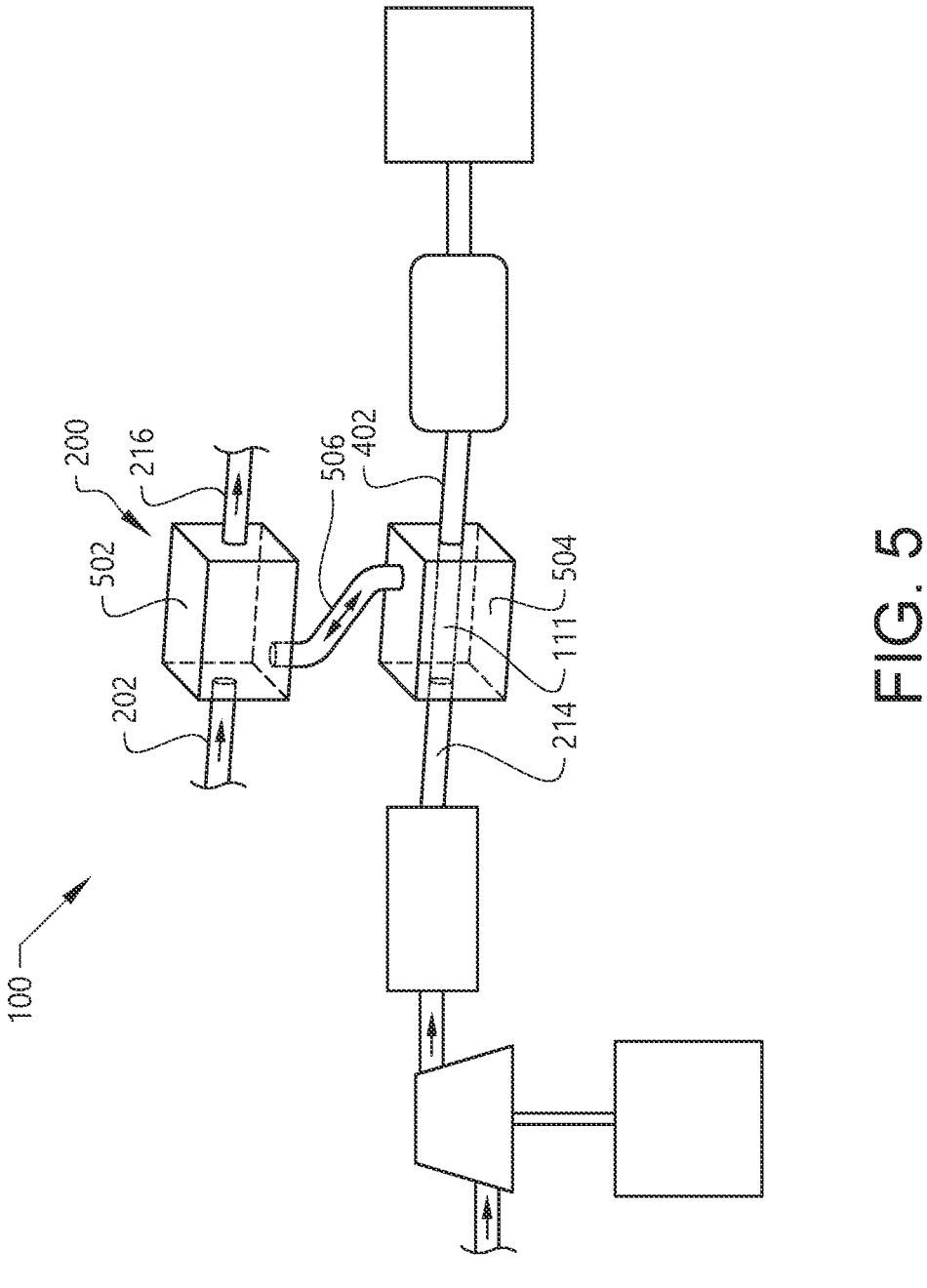
FIG. 5 is a schematic illustration of a braking system according to a yet still further example embodiment.

Turning now to FIG. 5 which is a schematic illustration of the braking system 100 according to a yet still further example embodiment. In a similar vein as describe above, the braking system 100 in FIG. 5 comprises, or can comprise, all features described above unless explicitly described otherwise.

As can be seen in FIG. 5, the tank arrangement 200 here comprises a first tank 502 and a second tank 504. The first inlet 202 and the first outlet 216 are arranged in the first tank 502, while second inlet 214 and the second outlet 402 are arranged in the second tank 504. The first tank 502 is thus arranged to receive the fuel cell exhaust from the fuel cell system (see FIG. 2), and to discharge fuel cell exhaust through the first outlet 216. The first tank 502 can thus arranged as a fluid separator. The second tank 504 is provided with the air conduit 111 arranged between the second inlet 214 and the second outlet 402.

Furthermore, the first 502 and second 504 tanks are connected to each other by a tank conduit 506. By means of the tank conduit 506, the fuel cell exhaust, and more particularly the liquid contained in the fuel cell exhaust, can be directed to the second tank 504. In a similar vein, heated air from the second tank 504 can be directed through the tank conduit 506 and into the first tank 502. The first 502 and second 504 tanks of the tank arrangement can hereby be arranged at a distance from each other.

It is to be understood that the present disclosure is not limited to the embodiments described above and illustrated in the drawings; rather, the skilled person will recognize that many changes and modifications may be made within the scope of the appended claims.

The invention claimed is:

1. A braking system for a vehicle comprising a fuel cell system generating electric power to an electric power system arranged to propel an electric traction motor, the braking system comprising:

a tank arrangement comprising a first inlet configured to be arranged in downstream fluid communication with a cathode outlet of the fuel cell system for receiving fuel cell exhaust comprising water, and a first outlet configured to at least convey fuel cell exhaust from the tank arrangement, and an air blower operable at least during power generative braking of the electric traction motor, the air blower being configured to convey pressurized ambient air into an air conduit, wherein the air conduit is extending between the air blower and a second inlet of the tank arrangement for feeding pressurized ambient air into the tank arrangement to form a mixture of pressurized ambient air and fuel cell exhaust in the tank arrangement.

2. The braking system of claim 1, wherein the braking system further comprises an electric machine configured to be electrically connected to the electric power system, wherein the air blower is connected to, and operable by, the electric machine.

3. The braking system of claim 1, wherein the second inlet is arranged at a vertically lower position of the tank arrangement compared to the position of the first inlet.

4. The braking system of claim 1, wherein the air conduit extends through the tank arrangement between the second inlet and a second outlet.

5. The braking system of claim 1, wherein the braking system further comprises a bypass valve, the bypass valve being arranged in the air conduit at a position between the air blower and the tank arrangement, the bypass valve being configured to controllably prevent air conveyed from the air blower to reach the tank arrangement.

6. The braking system of claim 5, wherein the braking system further comprises a bypass conduit, the bypass conduit extending from the bypass valve to a position of the air conduit downstream of the tank arrangement.

7. The braking system of claim 1, wherein the braking system further comprises at least one air flow restrictor, the at least one air flow restrictor being arranged in the air conduit at a position downstream of the air blower.

8. The braking system of claim 7, wherein the at least one air flow restrictor is arranged in the air conduit at a position between the air blower and the tank arrangement.

9. The braking system of claim 1, wherein the braking system further comprises an air heating arrangement, the air heating arrangement being arranged in the air conduit at a position upstream of the tank arrangement, or at a position downstream of the tank arrangement, the air heating arrangement being electrically connectable to the electric power system.

10. The braking system of claim 9, wherein the air heating arrangement is an electric resistor arrangement.

11. The braking system of claim 1, wherein the tank arrangement comprises a first tank and a second tank arranged in fluid communication with each other, wherein the first inlet and first outlet are arranged in the first tank, and the second inlet is arranged in the second tank.

12. The braking system of claim 11, wherein the first and second tanks are connected to each other by a tank conduit.

13. The braking system of claim 1, wherein the air blower is an air compressor.

14. The braking system of claim 1, wherein the tank arrangement comprises a liquid fluid and a gaseous fluid.

15. A vehicle, comprising:

an electric traction motor electrically connected to an electric power system, the electric traction motor being configured to receive electric power from the electric power system during propulsion and to supply electric power, generated during braking, to the electric power system, wherein the vehicle further comprises a fuel cell system configured to generate electric power, the fuel cell system being electrically connected to the electric power system, and the braking system of claim 1.

\* \* \* \* \*